US012734838B2

(12) United States Patent
Jia et al.

(10) Patent No.: US 12,734,838 B2
(45) Date of Patent: Sep. 15, 2026

(54) PRINTER HAVING REPLACEABLE PRINT HEAD

(71) Applicant: GUANGZHOU MUNBYN INFORMATION TECH CO LTD, Guangzhou (CN)

(72) Inventors: Zhuo Jia, Guangzhou (CN); Jinpeng Yuan, Guangzhou (CN); Shuzhong Liu, Guangzhou (CN); Tao Wang, Guangzhou (CN)

(*) Notice: Subject to any disclaimer, the term of this patent is extended or adjusted under 35 U.S.C. 154(b) by 143 days.

(21) Appl. No.: 18/991,348

(22) Filed: Dec. 21, 2024

(65) Prior Publication Data

US 2026/0109164 A1 Apr. 23, 2026

(51) Int. Cl.

*B41J 25/34* (2006.01)
*B41J 2/32* (2006.01)
*B41J 3/407* (2006.01)

(52) U.S. Cl.

CPC ................. *B41J 25/34* (2013.01); *B41J 2/32* (2013.01); *B41J 3/4075* (2013.01)

(58) Field of Classification Search

CPC ... B41J 25/34; B41J 2/32; B41J 3/4075; B41J 2/325; B41J 11/04; B41J 15/04; B41J 29/48; B41J 2002/14491; B41J 2/04585; B41J 2/17526

See application file for complete search history.

(56) References Cited

U.S. PATENT DOCUMENTS 5,779,371 A * 7/1998 Aoyama .................. B41J 25/34 400/120.16

* cited by examiner

*Primary Examiner* — Lisa Solomon
(74) *Attorney, Agent, or Firm* — Sandy Lipkin

(57) ABSTRACT

The present invention discloses a printer having a replaceable print head, and relates to the technical field of heat-sensitive label printers. The printer of the present invention includes a printer body and a print head housing; the printer body is provided with a flicking needle base and a locking base; the locking base is internally provided with a fixation component; the print head housing is internally provided with a thermal print head; a mounting box is disposed at one side of the printer body and is internally provided with a reel and a driving gear, the reel is internally sleeved with a reel roller, and the reel roller is internally provided with a thrust gear.

9 Claims, 7 Drawing Sheets

PRINTER HAVING REPLACEABLE PRINT HEAD

CROSS REFERENCE TO RELATED APPLICATIONS

The present application claims the priority of Chinese patent application No. 2024206281582, filed on Oct. 22, 2024, and contents of which are incorporated herein by reference.

TECHNICAL FIELD

The present invention relates to the technical field of heat-sensitive label printers, and in particular to a printer having a replaceable print head.

BACKGROUND

Label printers have been extensively applied to various fields such as offices, factories, and shopping malls. The operating principle of a thermal printer is to mount a semiconductor heating element on the print head; the print head is heated and contacts thermal printing paper to print out desired patterns; the principle is similar to that of a heat-sensitive fax machine; and images are generated by heating to produce a chemical reaction in a membrane. Such a thermal printer chemical reaction is conducted at a certain temperature. High temperature will accelerate such a chemical reaction. When temperature is lower than 60° C., it needs to take a considerable long time and even several years for paper to get deep color; when temperature is 200° C., such a reaction will be completed within several microseconds. The core component of the print head assembly is a heat-sensitive sheet which is a vulnerable part and needs to be replaced frequently. The print head of the existing printer cannot be replaced; alternatively, the print head is disassembled and mounted comparatively tediously during replacement such that the print head cannot be maintained rapidly and conveniently in case of damage.

On the basis of foregoing, a printer having a replaceable print head is now provided to eliminate the shortcomings of the existing devices.

SUMMARY

The objective of the present invention is to provide a printer having a replaceable print head, thereby solving the problem in the background art, i.e., the print head cannot be maintained rapidly and conveniently.

To achieve the above objective, the present invention provides the following technical solution.

A printer having a replaceable print head is provided, including a printer body and a print head housing; the printer body is provided with a flicking needle base and a locking base; a flicking needle matched with the flicking needle base is disposed at a bottom end of the print head housing; the locking base is internally provided with a fixation component for fixing the print head housing; the print head housing is internally provided with a thermal print head; a first connector is disposed at one side of the printer body and is internally and electrically connected with a second connector; the second connector is fixedly disposed on one side of a mounting box that is internally provided with a reel internally sleeved with a reel roller; a guide component for guiding a printing material is disposed at an upper end of the printer body; several sliding chutes are disposed on the reel roller in an equal interval and are all internally provided with a locking slide block slidably; the reel roller is internally provided with a thrust gear for pushing the several locking slide blocks to move; a calender roller is clung to one side of the reel and is rotatably disposed in an inner side of a rotating frame; one side of the rotating frame is fixedly connected to output ends of several spring extension rods, respectively; the spring extension rods are disposed in a mounting hole at one side of the mounting box; and the mounting box is internally provided with a driving gear for driving the reel to discharge evenly.

On the basis of the aforesaid technical solution, the present invention further provides the following alternative technical solutions:

In an alternative solution, the fixation component includes two first limiting frames that are arranged symmetrically and all slidably disposed in an inner part of the printer body; a mounting groove is disposed at an upper end of the locking base in a position corresponding to one end of each said first limiting frame; a connecting plate is disposed between the two first limiting frames; a pressing lever is disposed on one side of the connecting plate; a first reset spring is disposed between one end of the pressing lever and the inner part of the printer body; a baffle is disposed on one side of the printer body and at one end of the pressing lever, and buckles are symmetrically disposed at the bottom end of the print head housing in positions corresponding to the first limiting frames.

In an alternative solution, the guide component includes first guide rollers and rotary mounting plates; the two first guide rollers and the two rotary mounting plates are each symmetrically and rotatably disposed on the upper end of the printer body; limiting rollers are symmetrically and rotatably disposed in an inner side of each said rotary mounting plate and are aligned at mounting positions of the first guide rollers; the mounting box is internally and rotatably provided with a second guide roller; several fixed blocks are fixedly disposed on one side of the printer body; sleeved tubes are fixedly disposed at one side of the mounting box in positions corresponding to the fixed blocks, and are sleeved to the fixed blocks; and the sleeved tubes and the fixed blocks are all fixedly connected via bolts.

In an alternative solution, an extending plate is fixedly disposed on one side of one of the rotary mounting plates; a magnet is fixedly disposed at a bottom end of the extending plate; a mounting groove is disposed on another one of the rotary mounting plates and is internally provided with an adsorption iron plate.

In an alternative solution, the thrust gear includes a connecting rod hingedly disposed on one side of each said locking slide block; opposite ends of the several connecting rods are all hingedly coupled to one end of a push rod; a second tension spring is disposed between one end of the push rod and an inner part of the reel roller; a guide rod is clung to one end of the push rod and is fixedly disposed at a bottom end of the inner part of the mounting box, and one end of the guide rod is arranged in an inclined manner; a first ball is disposed on one end of the push rod; a limiting groove is disposed at both ends of each said locking slide block and is internally provided with a guide groove rod slidably, and the guide groove rod is fixedly disposed in an inner part of the reel roller; a supporting frame plate is rotatably disposed at both ends of the reel roller and is fixedly disposed in the inner part of the mounting box, and one of the supporting frame plates is provided with a limiting component for fixing the reel roller.

In an alternative solution, the limiting component includes a second limiting frame; a connecting box is fixedly disposed on one of the supporting frame plates and is internally and slidably provided with the second limiting frame; a second reset spring is arranged between one side of the second limiting frame and one side of an inner part of the mounting box, and one end of the second limiting frame extends into an inner side of an open end of each said supporting frame plate.

In an alternative solution, the driving gear includes a second driving disc fixedly disposed on a rotating shaft at one end of the reel roller; a first driving disc is matched with one side of the second driving disc and is fixedly disposed at one end of a drive shaft; the drive shaft is rotatably disposed inside the mounting box and is fixedly provided with a worm gear; a worm is engaged on the worm gear and is rotatably provided with a first rotating plate on both ends thereof; the first rotating plate is fixedly disposed inside the mounting box; a first gear wheel is fixedly disposed on a rotating shaft at one end of the worm and is engaged with a second gear wheel that is fixedly disposed at one end of a stationary shaft; the stationary shaft is rotatably provided with several second rotating plates that are all fixedly disposed at the bottom end of the interior mounting box; a first outer spline shaft is fixedly disposed at one end of the stationary shaft and is slidably provided with a first inner spline shaft in splined fit connection with the first outer spline shaft; a third reset spring is disposed between the first inner spline shaft and the first outer spline shaft; a driven cone friction wheel is fixedly disposed at one end of the first inner spline shaft and is frictionally clung to a driving cone friction wheel that is fixedly disposed on a second inner spline shaft; the second inner spline shaft is slidably disposed on a second outer spline shaft in splined fit connection with the second inner spline shaft; a tension spring is disposed between one end of the second outer spline shaft and one end of the second inner spline shaft; an output end of a motor is fixedly connected with one end of the second outer spline shaft, and the motor is fixedly disposed at the bottom end of the inner part of the mounting box; a third rotating plate is rotatably disposed on the second inner spline shaft and is fixedly disposed at a bottom end of a sliding plate; a sliding rack is slidably disposed at both ends of the sliding plate and is fixedly disposed at the bottom end of the inner part of the mounting box; a guide block is fixedly disposed at one side of the sliding plate, and a top rod is clung to a slope position of the guide block and is fixedly disposed on one side of the rotating frame, and the motor is electrically connected to the printer body.

In an alternative solution, a paper inlet plane is disposed on the upper end of the printer body, and a paper outlet plane is disposed at a lower part of the printer body; the paper inlet plane has a vertical operating angle of 0-90°, and preferably 30-60°; the paper outlet plane has a horizontal operating angle of 0-90°, and preferably 30-60°; and an included angle between the paper inlet plane and the paper outlet plane is 90-180°, and preferably 180°.

In an alternative solution, a press controller is fixedly disposed on one side of one of the supporting frame plates, an extrusion rack is fixedly disposed on the rotating frame in a position corresponding to the press controller, and the press controller is electrically connected to the printer body.

Compared with the prior art, the present invention has the following advantageous effects:

According to the present invention, the printer body and the print head housing are provided with a flicking needle base and a flicking needle, respectively, and the print head housing is fixed via a fixation component such that the print head housing is disassembled, replaced and maintained conveniently. Meanwhile, a mounting box is disposed at one side of the printer body such that a reel wound with printing roll paper can be placed in the interior of the mounting box when printing roll paper is used for printing. A guide component is disposed in the interior of the reel roller such that the reel is fixedly disposed on the reel roller, and thus rotates along with the reel roller upon rotation. The first inner spline shaft is in fractional fit with the driving cone friction wheel such that a contacting section between the driving cone friction wheel and the first inner spline shaft varies from the change of the winding diameter of the printing paper wound on the reel, thereby enabling the reel to discharge evenly under the action of the calender roller, the top rod, and guide block. Moreover, a press controller is disposed such that after the printing roll paper on the reel is used up, the press controller can be extruded by an extrusion rack to remind workers to replace the reel, thereby enhancing the practicability of the printer having a replaceable print head.

Figure 1:
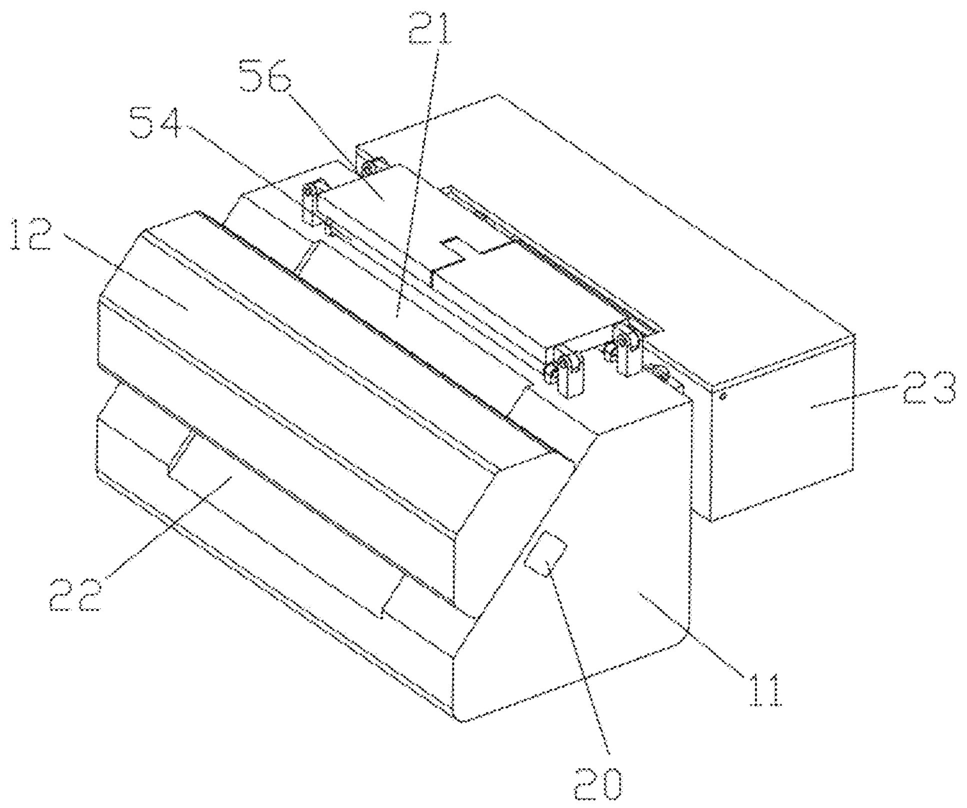
FIG. 1 is a schematic diagram showing a structure of the present invention.

annotations for the numerals in the drawings: 11 printer body, 12 print head housing, 13 thermal print head, 14 flicking needle, 15 flicking needle base, 16 locking base, 17 buckle, 18 first limiting frame, 19 first reset spring, 20 baffle, 21 paper inlet plane, 22 paper outlet plane, 23 mounting box, 24 first connector, 25 second connector, 26 reel, 27 reel roller, 28 supporting frame plate, 29 second limiting frame, 30 second reset spring, 31 locking slide block, 32 connecting rod, 33 push rod, 34 guide rod, 35 first driving disc, 36 second driving disc, 37 drive shaft, 38 worm gear, 39 worm, 40 first gear wheel, 41 second gear wheel, 42 first inner spline shaft, 43 driven cone friction wheel, 44 third reset spring, 45 driving cone friction wheel, 46 tension spring, 47 second inner spline shaft, 48 motor, 49 guide block, 50 top rod, 51 calender roller, 52 spring extension rod, 53 press controller, 54 first guide roller, 55 limiting roller, and 56 rotary mounting plate.

DETAILED DESCRIPTION OF EMBODIMENTS

To make the objectives, technical solutions and advantages of the present invention clearer, the present invention will be further described in detail with reference to the accompanying drawings and embodiments.

Embodiment 1

Figure 2:
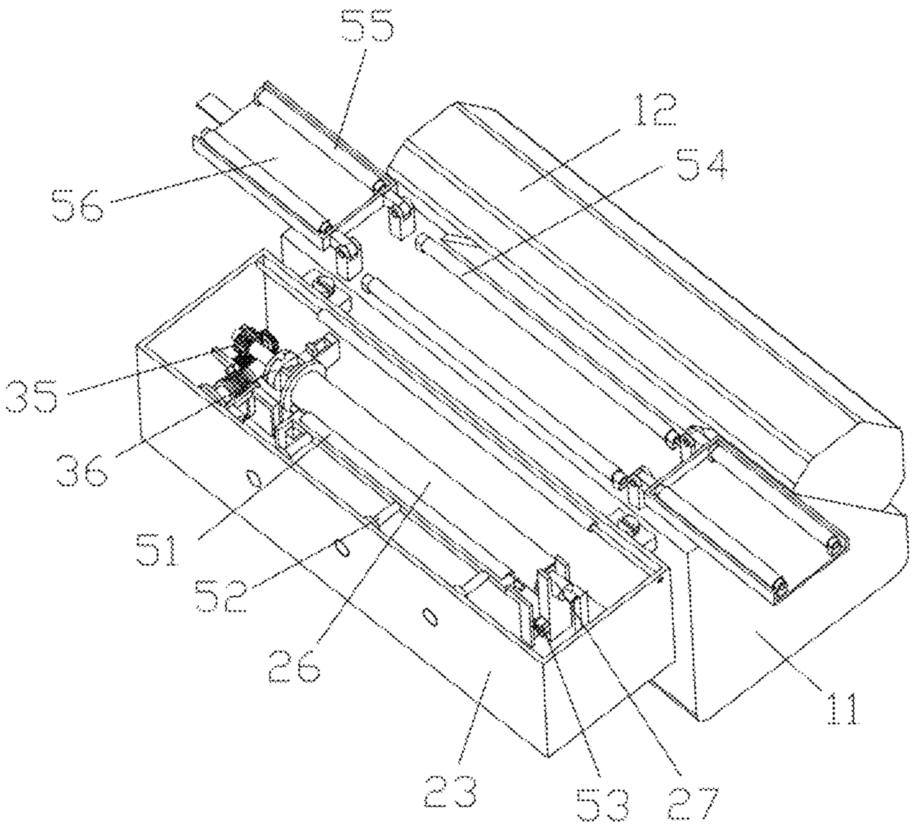
FIG. 2 is a schematic diagram showing an interior structure of a mounting box according to the present invention.
Figure 3:
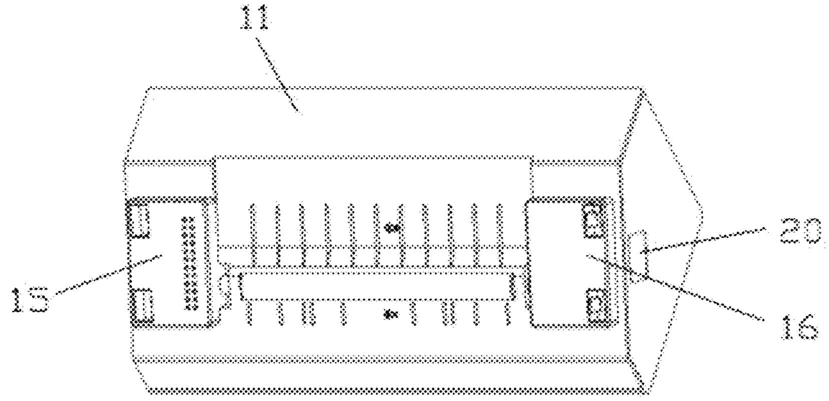
FIG. 3 is a schematic diagram showing a structure of a printer body according to the present invention.
Figure 4:
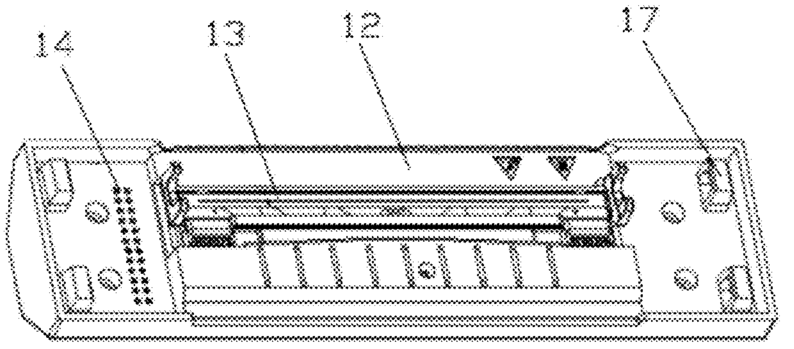
FIG. 4 is a schematic diagram showing a structure of a print head housing according to the present invention.
Figure 5:
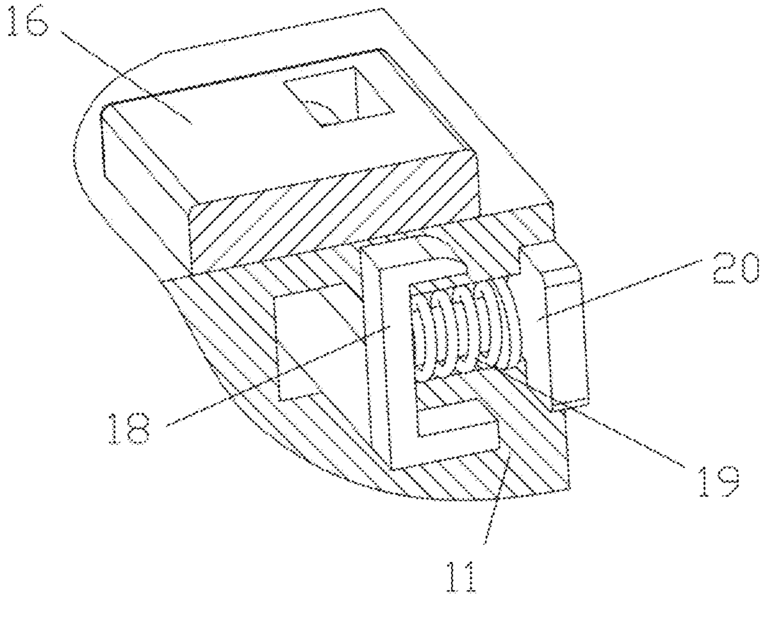
FIG. 5 is a schematic diagram showing a structure of a flicking needle base according to the present invention.
Figure 6:
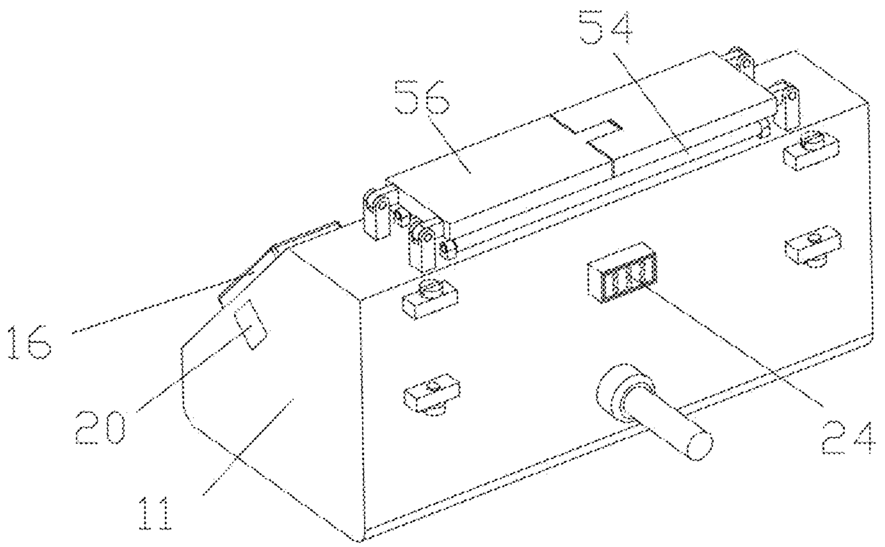
FIG. 6 is a schematic diagram showing assembly of a first connector according to the present invention.
Figure 7:
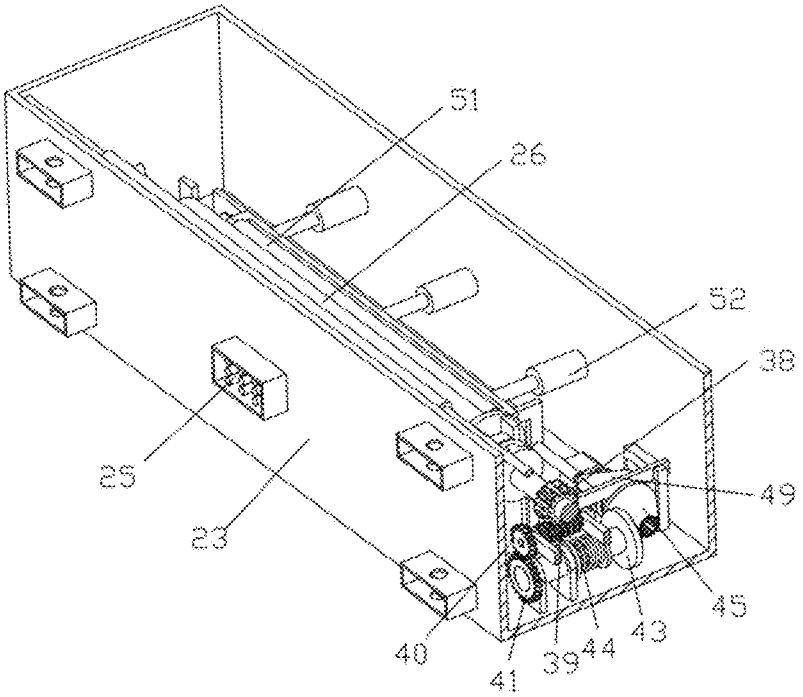
FIG. 7 is a schematic diagram showing assembly of a second connector according to the present invention.
Figure 8:
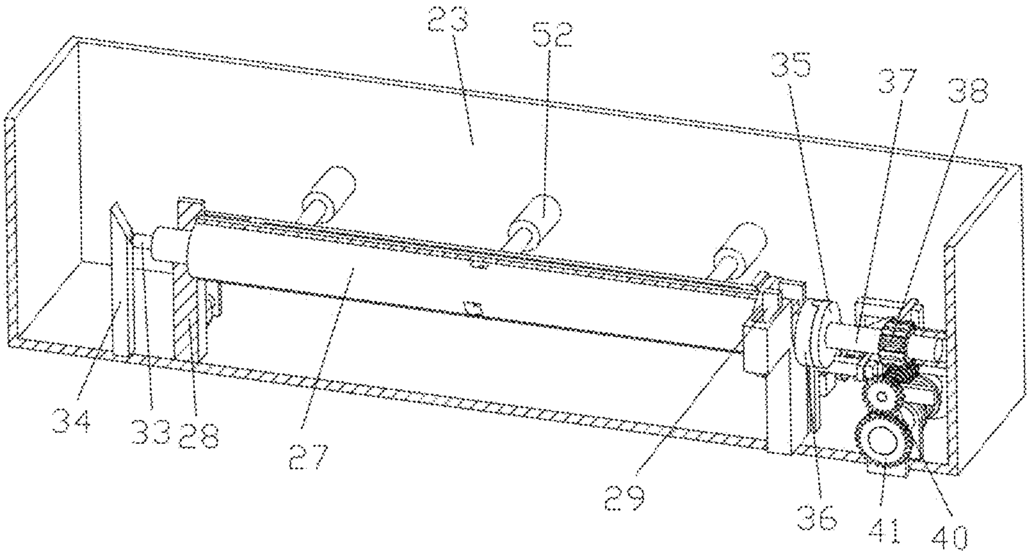
FIG. 8 is a schematic diagram showing a structure of a reel roller according to the present invention.
Figure 9:
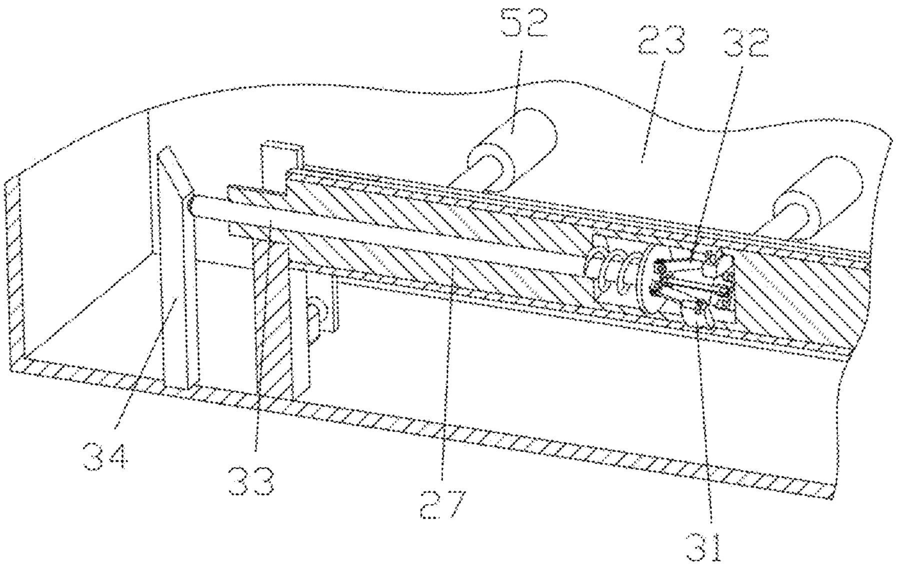
FIG. 9 is a schematic diagram showing an interior structure of the reel roller according to the present invention.
Figure 10:
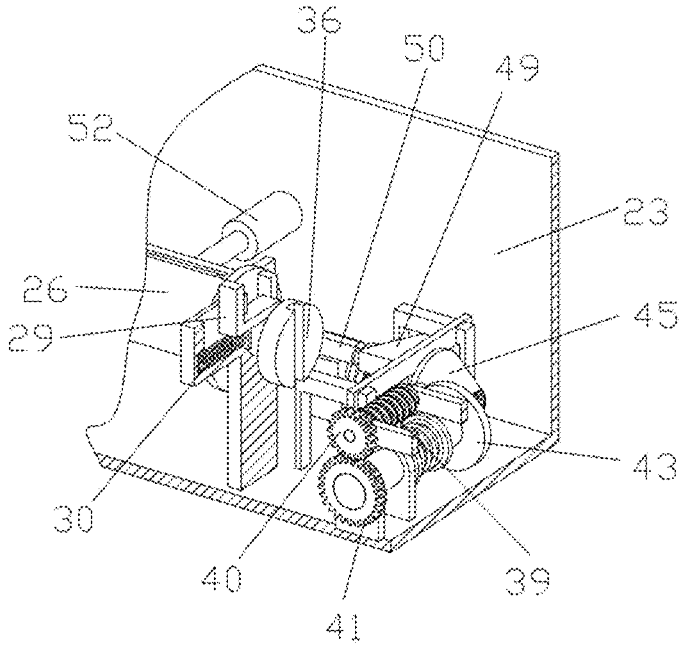
FIG. 10 is a schematic diagram showing structures of a second limiting frame and a second driving disc according to the present invention.
Figure 11:
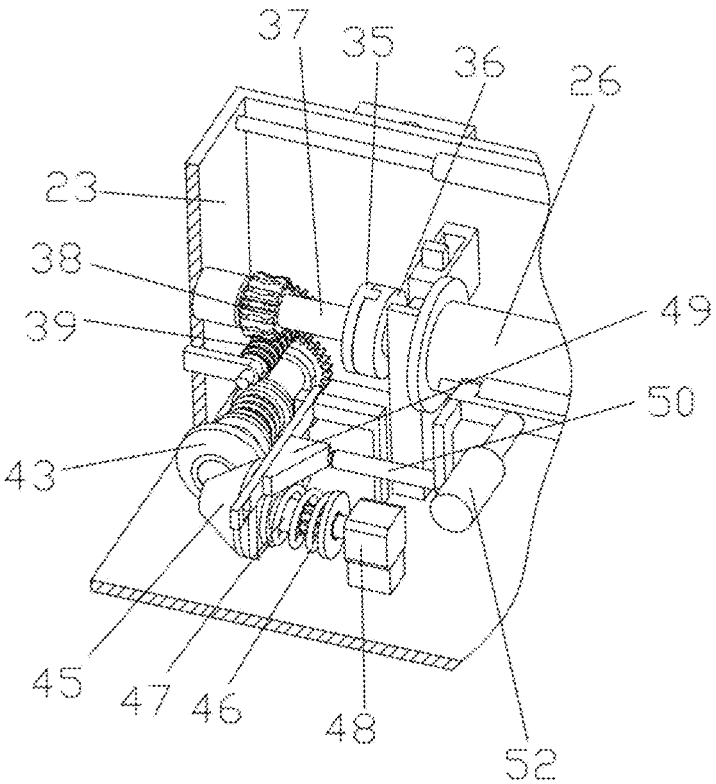
FIG. 11 is a schematic diagram showing structures of a guide block and a top rod according to the present invention.
Figure 12:
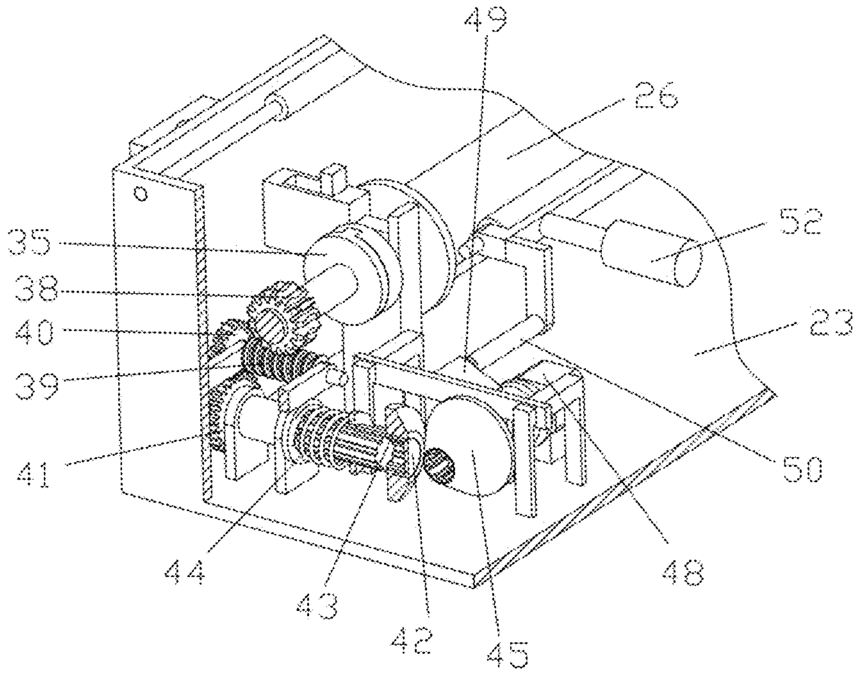
FIG. 12 is a schematic diagram showing a structure of a driven cone friction wheel according to the present invention.
Figure 13:
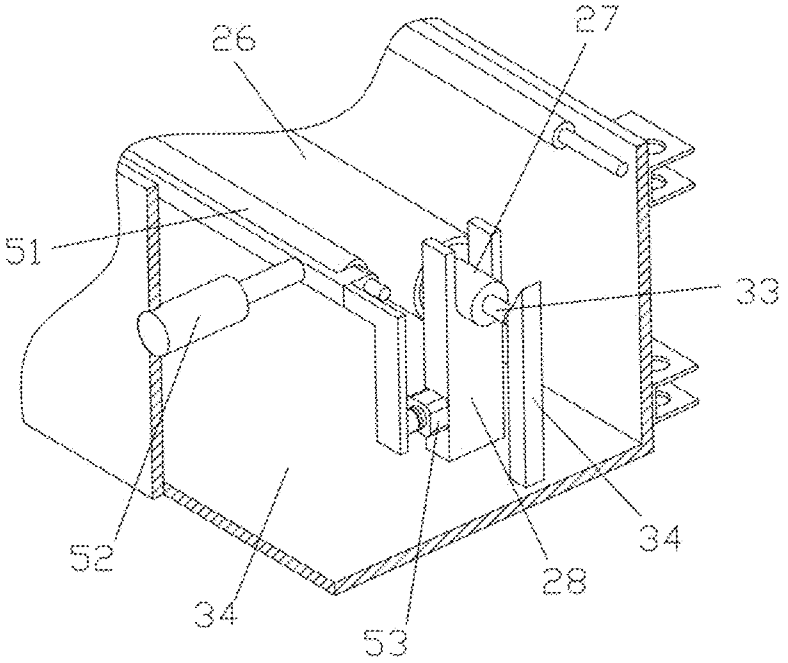
FIG. 13 is a schematic diagram showing assembly of a press controller according to the present invention.

In an embodiment, as shown in FIGS. 1-13, a printer having a replaceable print head includes a printer body 11 and a print head housing 12; the printer body 11 is provided with a flicking needle base 15 and a locking base 16, and a flicking needle 14 matched with the flicking needle base 15 is disposed at a bottom end of the print head housing 12; the locking base 16 is internally provided with a fixation component for fixing the print head housing 12; the print head housing 12 is internally provided with a thermal print head 13; a first connector 24 is disposed on one side of the printer body 11 and is internally and electrically connected with a second connector 25; the second connector 25 is fixedly disposed on one side of a mounting box 23 that is internally provided with a reel 26 internally sleeved with a reel roller 27; a guide component for guiding a printing material is disposed at an upper end of the printer body 11; several sliding chutes are disposed on the reel roller 27 in an equal interval and are each internally provided with a locking slide block 31 slidably; the reel roller 27 is internally provided with a thrust gear for pushing the several locking slide blocks 31 to move; a calender roller 51 is clung to one side of the reel 26 and is rotatably disposed in an inner side of a rotating frame; one side of the rotating frame is fixedly connected to output ends of the several spring extension rods 52; the spring extension rods 52 are disposed into a mounting hole on one side of the mounting box 23; and the mounting box 23 is internally provided with a driving gear for driving the reel 26 to discharge evenly. The thrust gear enables the several locking slide blocks 31 to be pushed to move conveniently, thereby fixing the reel 26. The driving gear enables the reel 26 to rotate and discharge evenly.

The fixation component includes two first limiting frames 18 that are arranged symmetrically and all slidably disposed in an inner part of the printer body 11; a mounting groove is disposed at an upper end of the locking base 16 in a position corresponding to one end of each said first limiting frame 18; a connecting plate is disposed between the two first limiting frames 18; a pressing lever is disposed on one side of the connecting plate; a first reset spring 19 is disposed between one end of the pressing lever and the inner part of the printer body 11; a baffle 20 is disposed on one side of the printer body 11 and at one end of the pressing lever, and buckles 17 are symmetrically disposed at the bottom end of the print head housing 12 in positions corresponding to the first limiting frames 18. During use procedure, when the thermal print head 13 needs to be replaced, the push rod and the pressing lever push the first limiting frames 18 to move such that one end of the first limiting frames 18 is away from the buckles 17, thus taking down the print head housing 12. Afterwards, a print head housing 12 fitted with an intact thermal print head 13 is mounted and used such that the overall print head housing 12 and the thermal print head 13 are replaced. Subsequently, the flicking needle 14 is aligned at the flicking needle hole on the flicking needle base 15 such that the flicking needle 14 is inserted into the flicking needle hole to achieve the electric connection between the thermal print head 13 and printer body 11; meanwhile, first limiting frames 18 are matched with buckles 17 such that the print head housing 12 is fixed.

The guide component includes first guide rollers 54 and rotary mounting plates 56; the two first guide rollers 54 and the two rotary mounting plates 56 are each symmetrically and rotatably disposed on the upper end of the printer body 11; limiting rollers 55 are symmetrically and rotatably disposed in an inner side of each said rotary mounting plates 56 and are aligned at mounting positions of the first guide rollers 54; the mounting box 23 is internally and rotatably provided with a second guide roller; several fixed blocks are fixedly disposed on one side of the printer body 11; sleeved tubes are fixedly disposed at one side of the mounting box 23 in positions corresponding to the fixed blocks, and are sleeved to the fixed blocks; and the sleeved tubes and the fixed blocks are all fixedly connected via bolts. In use procure, when printing roll paper needs to be printed by the printer body 11, the rotary mounting plates 56 are opened such that the limiting rollers 55 are away from the first guide rollers 54, and then one end of the printing roll paper penetrates through the second guide roller, the first guide rollers 54, and the paper inlet plane 21 on the upper end of the printer body 11, and then one end of the printing roll paper moves out of the paper outlet plane 22; afterwards, the rotary mounting plates 56 are closed such that the printing roll paper is limited by the limiting rollers 55.

An extending plate is fixedly disposed on one side of one of the rotary mounting plates 56; a magnet is fixedly disposed at a bottom end of the extending plate; a mounting groove is disposed on another one of the rotary mounting plates 56 and is internally provided with an adsorption iron plate. In use procedure, when the two rotary mounting plates 56 are closed, the magnet is matched with the adsorption iron plate such that the two rotary mounting plates 56 are fixed.

The thrust gear includes a connecting rod 32 hingedly disposed on one side of each said locking slide block 31; opposite ends of the several connecting rods 32 are hingedly coupled to one end of a push rod 33; a second tension spring is disposed between one end of the push rod 33 and an inner part of the reel roller 27; a guide rod 34 is clung to one end of the push rod 33 and is fixedly disposed at a bottom end of the interior mounting box 23, and one end of the guide rod 34 is arranged in an inclined manner; a first ball is disposed on one end of the push rod 33; a limiting groove is disposed at both ends of each said locking slide block 31 and is internally provided with a guide groove rod slidably, and the guide groove rod is fixedly disposed in an inner part of the reel roller (27); a supporting frame plate 28 is rotatably disposed at both ends of the reel roller 27 and is fixedly disposed in an inner part of the mounting box (23), and one of the supporting frame plates 28 is provided with a limiting component for fixing the reel roller 27.

The limiting component includes a second limiting frame 29; a connecting box is fixedly disposed on one of the supporting frame plates 28 and is internally and slidably provided with the second limiting frame 29; a second reset spring 30 is arranged between one side of the second limiting frame 29 and one side of an inner part of the mounting box, and one end of the second limiting frame 29 extends into an inner side of an open end of the supporting frame plate 28. In use procedure, when printing roll paper is mounted, the reel roller 27 is taken out of the mounting box 23, and then one end of the reel roller 27 is sleeved in an inner side of the reel 26 wound with printing paper, and the rotating shafts at both ends of the reel roller 27 are aligned at the positions of the two supporting frame plates 28. The second limiting frame 29 is pulled such that both ends of the reel roller 27 rotate and move inside the inner side of the open ends of the supporting frame plates 28. Meanwhile, one end of the push rod 33 contacts the slope of the guide rod 34 such that the push rod 33 is guided by the guide rod 34 to push the locking slide block 31 via the connecting rod 32 to move. The outer side of the locking slide block 31 is clung to the inside of the reel 26, thus fixing the reel 26. After the reel roller 27 is mounted, the second limiting frame 29 is loosened and may fix the rotating shaft at one end of the reel roller 27.

The driving gear includes a second driving disc 36 fixedly disposed on a rotating shaft at one end of the reel roller 27; a first driving disc (35) is matched with one side of the second driving disc 36 and is fixedly disposed at one end of a drive shaft 37; the drive shaft 37 is rotatably disposed in an inner side of the mounting box 2 and is fixedly provided with a worm gear 38; a worm 39 is engaged on the worm gear 38 and is rotatably provided with a first rotating plate on both ends thereof; the first rotating plate is fixedly disposed in an inner part of the mounting box 23; a first gear wheel 40 is fixedly disposed on a rotating shaft at one end of the worm 39 and is engaged with a second gear wheel 41 that is fixedly disposed at one end of a stationary shaft; the stationary shaft is rotatably provided with several second rotating plates that are all fixedly disposed at the bottom end of the interior mounting box 23; a first outer spline shaft is fixedly disposed at one end of the stationary shaft and is slidably provided with a first inner spline shaft 42 in splined fit connection with the first outer spline shaft; a third reset spring 44 is disposed between the first inner spline shaft 42 and the first outer spline shaft; a driven cone friction wheel 43 is fixedly disposed at one end of the first inner spline shaft 42 and is frictionally clung to a driving cone friction wheel 45 that is fixedly disposed on a second inner spline shaft 47; the second inner spline shaft 47 is slidably disposed on a second outer spline shaft in splined fit connection with the second inner spline shaft 47; a tension spring 46 is disposed between one end of the second outer spline shaft and one end of the second inner spline shaft 47; an output end of a motor 48 is fixedly connected with one end of the second outer spline shaft, and the motor 48 is fixedly disposed at the bottom end of the interior mounting box 23; a third rotating plate is rotatably disposed on the second inner spline shaft 47 and is fixedly disposed at a bottom end of a sliding plate; a sliding rack is slidably disposed at both ends of the sliding plate and is fixedly disposed at the bottom end of the interior mounting box 23; a guide block 49 is fixedly disposed at one side of the sliding plate, and a top rod 50 is clung to a slope position of the guide block 49 and is fixedly disposed on one side of the rotating frame, and the motor 48 is electrically connected to the printer body 11. In use procedure, when the motor 48 drives the reel 26 to rotate through the driving cone friction wheel 45, the driven cone friction wheel 43, second gear wheel 41, first gear wheel 40, worm 39, and the worm gear 38, the reel 26 may unfold the printing roll paper to make printing available. The winding diameter on the reel 26 will decrease as the use of the printing roll paper on the reel 26; under the action of the spring extension rod 52, the calender roller 51 is always clung to the printing roll paper on the reel 26. When the calender roller 51 changes from the winding diameter on the reel 26, the rotating frame drives the top rod 50 to move. The top rod 50 moves on the slope of the guide block 49 such that the position of the driving cone friction wheel 45 is guided by the top rod 50; when the winding diameter on the reel 26 decreases, the diameter of the contacting section between the driving cone friction wheel 45 and the driven cone friction wheel 43 increases such that the rotational speed of the driven cone friction wheel 43 increases, and meanwhile, the rotational speed of the reel 26 increases. With the gradual decrease of the winding diameter on the reel 26, the rotational speed of the driven cone friction wheel 43 changes continuously such that the reel 26 may discharge evenly all the time, being convenient for the printing of the thermal print head 13.

A paper inlet plane is disposed on the upper end of the printer body, and a paper outlet plane is disposed at a lower part of the printer body; the paper inlet plane has a vertical operating angle of 0-90°, and preferably 30-60°; the paper outlet plane has a horizontal operating angle of 0-90°, and preferably 30-60°; and an included angle between the paper inlet plane 21 and the paper outlet plane 22 is 90-180°, and preferably 180°. In use procedure, the paper inlet plane 21 is disposed on the upper end of the printer body 11 such that the printing paper is put conveniently. The paper outlet plane 22 is disposed at a lower part of the printer body 11 such that the printing content is conveniently viewed. Meanwhile, the included angle between the paper inlet plane 21 and the paper outlet plane 22 is preferably 180°, which may reduce the paper delivery resistance of the printing paper.

Embodiment 2

Embodiment 2 differs from Embodiment 1 in that a press controller 53 is fixedly disposed on one side of one of the supporting frame plates 28, an extrusion rack is fixedly disposed on the rotating frame in a position corresponding to the press controller 53, and the press controller 53 is electrically connected to the printer body 11. In use procedure, when the winding diameter on the reel 26 decreases, the rotating frame drives the extrusion rack to move; after the printing roll paper on the reel 26 is used up, the press controller 53 is extruded by the extrusion rack such that the printer body 11 alarms, thereby reminding workers to replace the reel 26.

The aforesaid embodiment discloses a printer having a replaceable print head. When the printing roll paper is mounted, the reel roller 27 is taken out from the inner part of the mounting box 23, and then one end of the reel roller 27 is sleeved in the inner side of the reel 26 wound with printing paper, afterwards, the rotating shafts at both ends of the reel roller 27 are aligned at the positions of the two supporting frame plates 28. The second limiting frame 29 is pulled such that both ends of the reel roller 27 rotate and move inside the open end of the supporting frame plate 28. Meanwhile, one end of the push rod 33 contacts the slope of the guide rod 34 such that the push rod 33 is guided by the guide rod 34 to push the locking slide block 31 via the connecting rod 32 to move. The outside of the locking slide block 31 is clung to the inner side of the reel 26, thus fixing the reel 26. After the reel roller 27 is mounted, the second limiting frame 29 is loosened and may fix the rotating shaft at one end of the reel roller 27. Afterwards, the rotary mounting plates 56 are opened such that the limiting rollers 55 are away from the first guide rollers 54, and then one end of the printing roll paper penetrates through the second guide roller, the first guide rollers 54, and the paper inlet plane 21 on the upper end of the printer body 11, and then one end of the printing roll paper moves out of the paper outlet plane 22; afterwards, the rotary mounting plates 56 are closed such that the printing roll paper is limited by the limiting rollers 55. In printing process, the motor 48 drives the reel 26 to rotate through the driving cone friction wheel 45, the driven cone friction wheel 43, second gear wheel 41, first gear wheel 40, worm 39, and the worm gear 38; the reel 26 may unfold the printing roll paper to make printing available. The winding diameter on the reel 26 will decrease as the use of the printing roll paper on the reel 26; under the action of the spring extension rod 52, the calender roller 51 is always clung to the printing roll paper on the reel 26. When the calender roller 51 changes from the winding diameter on the reel 26, the rotating frame drives the top rod 50 to move. The top rod 50 moves on the slope of the guide block 49 such that the position of the driving cone friction wheel 45 is guided by the guide block 49; when the winding diameter on the reel 26 decreases, the diameter of the contacting section between the driving cone friction wheel 45 and the driven cone friction wheel 43 increases such that the rotational speed of the driven cone friction wheel 43 increases, and meanwhile, the rotational speed of the reel 26 increases. With the gradual decrease of the winding diameter on the reel 26, the rotational speed of the driven cone friction wheel 43 changes continuously such that the reel 26 may discharge evenly all the time, being convenient for the printing of the thermal print head 13.

When the winding diameter on the reel 26 decreases, the rotating frame drives the extrusion rack to move; after the printing roll paper on the reel 26 is used up, the press controller 53 is extruded by the extrusion rack such that the printer body 11 alarms, thereby reminding workers to replace the reel 26.

When the thermal print head 13 needs to be replaced, the push rod and the pressing lever push the first limiting frames 18 to move such that one end of each first limiting frame 18 is away from the buckle 17, thus taking down the print head housing 12. Afterwards, a print head housing 12 fitted with an intact thermal print head 13 is mounted and used such that the overall print head housing 12 and the thermal print head 13 are replaced. Subsequently, the flicking needle 14 is aligned at the flicking needle hole on the flicking needle base 15 such that the flicking needle 14 is inserted into the flicking needle hole to achieve the electric connection between the thermal print head 13 and printer body 11; meanwhile, the first limiting frames 18 are matched with buckles 17 such that the print head housing 12 is fixed.

What is described above are merely detailed embodiments of the present application, but the protection of the present invention is not limited thereto. Moreover, any change or replacement readily conceived by those skilled in the art within the technical scope disclosed in the present application shall fall within the protection scope of the present application. Therefore, the protection scope of the present application shall be subject to the protection scope of the claims.

The present invention discloses a printer having a replaceable print head, and relates to the technical field of heat-sensitive label printers. The printer of the present invention includes a printer body and a print head housing; the printer body is provided with a flicking needle base and a locking base; the locking base is internally provided with a fixation component; the print head housing is internally provided with a thermal print head; a mounting box is disposed at one side of the printer body and is internally provided with a reel and a driving gear, the reel is internally sleeved with a reel roller, and the reel roller is internally provided with a thrust gear. According to the present invention, the printer body and the print head housing are provided with a flicking needle base and a flicking needle, respectively, and the print head housing is fixed via a fixation component such that the print head housing is disassembled conveniently. The driving gear is disposed such that the reel can discharge evenly; and a press controller is disposed to remind workers to replace the reel.

What is claimed is:

1. A printer having a replaceable print head, comprising a printer body (11) and a print head housing (12), the printer body (11) being provided with a flicking needle base (15) and a locking base (16), wherein a flicking needle (14) matched with the flicking needle base (15) is disposed at a bottom end of the print head housing (12); the locking base (16) is internally provided with a fixation component for fixing the print head housing (12); the print head housing (12) is internally provided with a thermal print head (13); a first connector (24) is disposed on one side of the printer body (11) and is internally and electrically connected with a second connector (25); the second connector (25) is fixedly disposed on one side of a mounting box (23) that is internally provided with a reel (26) internally sleeved with a reel roller (27); a guide component for guiding a printing material is disposed at an upper end of the printer body (11); several sliding chutes are disposed on the reel roller (27) in an equal interval and are each internally provided with a locking slide block (31) slidably; the reel roller (27) is internally provided with a thrust gear for pushing the several locking slide blocks (31) to move; a calender roller (51) is clung to one side of the reel (26) and is rotatably disposed in an inner side of a rotating frame; one side of the rotating frame is fixedly connected to output ends of several spring extension rods (52), respectively; the spring extension rods (52) are disposed into a mounting hole on one side of the mounting box (23); and the mounting box (23) is internally provided with a driving gear for driving the reel (26) to discharge evenly.

2. The printer having a replaceable print head according to claim 1, wherein the fixation component comprises two first limiting frames (18) that are arranged symmetrically and all slidably disposed in an inner part of the printer body (11); a mounting groove is disposed at an upper end of the locking base (16) in a position corresponding to one end of each said first limiting frame (18); a connecting plate is disposed between the two first limiting frames (18); a pressing lever is disposed on one side of the connecting plate; a first reset spring (19) is disposed between one end of the pressing lever and the inner part of the printer body (11); a baffle (2) is disposed on one side of the printer body (11) and at one end of the pressing lever, and buckles (17) are symmetrically disposed at the bottom end of the print head housing (12) in positions corresponding to the first limiting frames (18).

3. The printer having a replaceable print head according to claim 1, wherein the guide component comprises first guide rollers (54) and rotary mounting plates (56); the two first guide rollers (54) and the two rotary mounting plates (56) are each symmetrically and rotatably disposed on the upper end of the printer body (11); limiting rollers (55) are symmetrically and rotatably disposed in an inner side of each said rotary mounting plate (56) and are aligned at mounting positions of the first guide rollers (54); the mounting box (23) is internally and rotatably provided with a second guide roller; several fixed blocks are fixedly disposed on one side of the printer body (11); sleeved tubes are fixedly disposed at one side of the mounting box (23) in positions corresponding to the fixed blocks, and are sleeved to the fixed blocks; and the sleeved tubes and the fixed blocks are all fixedly connected via bolts.

4. The printer having a replaceable print head according to claim 3, wherein an extending plate is fixedly disposed on one side of one of the rotary mounting plates (56); a magnet is fixedly disposed at a bottom end of the extending plate; a mounting groove is disposed on another one of the rotary mounting plates (56) and is internally provided with an adsorption iron plate.

5. The printer having a replaceable print head according to claim 1, wherein the thrust gear comprises a connecting rod (32) hingedly disposed on one side of each said locking slide block (31); opposite ends of the several connecting rods (32) are all hingedly coupled to one end of a push rod (33); a second tension spring is disposed between one end of the push rod (33) and an inner part of the reel roller (27); a guide rod (34) is clung to one end of the push rod (33) and is fixedly disposed at a bottom end of an inner part of the mounting box (23), and one end of the guide rod (34) is arranged in an inclined manner; a first ball is disposed on one end of the push rod (33); a limiting groove is disposed at both ends of each said locking slide block (31) and is internally provided with a guide groove rod slidably, and the guide groove rod is fixedly disposed in an inner part of the reel roller (27); a supporting frame plate (28) is rotatably disposed at both ends of the reel roller (27) and is fixedly disposed in the inner part of the mounting box (23), and one of the supporting frame plates (28) is provided with a limiting component for fixing the reel roller (27).

6. The printer having a replaceable print head according to claim 5, wherein the limiting component comprises a second limiting frame (29); a connecting box is fixedly disposed on one of the supporting frame plates (28) and is internally and slidably provided with the second limiting frame (29); a second reset spring (30) is arranged between one side of the second limiting frame (29) and one side of an inner part of the mounting box, and one end of the second limiting frame (29) extends into an open end of each said supporting frame plate (28).

7. The printer having a replaceable print head according to claim 6, wherein the driving gear comprises a second driving disc (36) fixedly disposed on a rotating shaft at one end of the reel roller (27); a first driving disc (35) is matched with one side of the second driving disc (36) and is fixedly disposed at one end of a drive shaft (37); the drive shaft (37) is rotatably disposed inside the mounting box (23) and is fixedly provided with a worm gear (38); a worm (39) is engaged on the worm gear (38) and is rotatably provided with a first rotating plate on both ends thereof; the first rotating plate is fixedly disposed in an inner part of the mounting box (23); a first gear wheel (40) is fixedly disposed on a rotating shaft at one end of the worm (39) and is engaged with a second gear wheel (41) that is fixedly disposed at one end of a stationary shaft; the stationary shaft is rotatably provided with several second rotating plates that are all fixedly disposed at the bottom end of the inner part of the mounting box (23); a first outer spline shaft is fixedly disposed at one end of the stationary shaft and is slidably provided with a first inner spline shaft (42) in splined fit connection with the first outer spline shaft; a third reset spring (44) is disposed between the first inner spline shaft (42) and the first outer spline shaft; a driven cone friction wheel (43) is fixedly disposed at one end of the first inner spline shaft (42) and is frictionally clung to a driving cone friction wheel (45) that is fixedly disposed on a second inner spline shaft (47); the second inner spline shaft (47) is slidably disposed on a second outer spline shaft in splined fit connection with the second inner spline shaft (47); a tension spring (46) is disposed between one end of the second outer spline shaft and one end of the second inner spline shaft (47); an output end of a motor (48) is fixedly connected with one end of the second outer spline shaft, and the motor (48) is fixedly disposed at the bottom end of the interior mounting box (23); a third rotating plate is rotatably disposed on the second inner spline shaft (47) and is fixedly disposed at a bottom end of a sliding plate; a sliding rack is slidably disposed at both ends of the sliding plate and is fixedly disposed at the bottom end of the inner part of the mounting box (23); a guide block (49) is fixedly disposed at one side of the sliding plate, and a top rod (50) is clung to a slope position of the guide block (49) and is fixedly disposed on one side of the rotating frame, and the motor (48) is electrically connected to the printer body (11).

8. The printer having a replaceable print head according to claim 1, wherein a paper inlet plane (21) is disposed on the upper end of the printer body (11), and a paper outlet plane (22) is disposed at a lower part of the printer body (11); the paper inlet plane (21) has a vertical operating angle of 0-90°, and the paper outlet plane (22) has a horizontal operating angle of 0-90°, and an included angle between the paper inlet plane (21) and the paper outlet plane (22) is 90-180°.

9. The printer having a replaceable print head according to claim 5, wherein a press controller (53) is fixedly disposed on one side of one of the supporting frame plates (28), an extrusion rack is fixedly disposed on the rotating frame in a position corresponding to the press controller (53), and the press controller (53) is electrically connected to the printer body (11).

* * * * *